United States Patent
Bergeron (10) Patent No.: US 9,553,786 B2
(45) Date of Patent: Jan. 24, 2017

(54) STORING DATA ASSOCIATED WITH PACKET RELATED METRICS

(71) Applicant: Ixia, Calabasas, CA (US)

(72) Inventor: Matthew R. Bergeron, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 58 days.

(21) Appl. No.: 14/465,453

(22) Filed: Aug. 21, 2014

(65) Prior Publication Data

US 2016/0057040 A1    Feb. 25, 2016

(51) Int. Cl.
*H04L 12/26* (2006.01)

(52) U.S. Cl.
CPC ........... *H04L 43/0876* (2013.01); *H04L 43/04* (2013.01); *H04L 43/50* (2013.01); *H04L 43/0829* (2013.01); *H04L 43/0852* (2013.01)

(58) Field of Classification Search
CPC ........ H04L 43/06; H04L 43/062; H04L 43/08; H04L 43/0811; H04L 43/0823; H04L 43/0829; H04L 43/0835; H04L 43/0841; H04L 43/0852; H04L 43/0858; H04L 43/0864; H04L 43/087; H04L 43/0876; H04L 43/50; H04L 47/10; H04L 43/04; H04Q 3/54591
See application file for complete search history.

(56) References Cited

U.S. PATENT DOCUMENTS

| | | | |
|---|---|---|---|
| 7,643,431 B2 | 1/2010 | Pepper | |
| 8,310,942 B2 | 11/2012 | Gintis et al. | |
| 8,582,466 B2 | 11/2013 | Gintis et al. | |
| 2004/0037277 A1* | 2/2004 | Mathews | H04Q 3/54591 370/386 |
| 2005/0013251 A1* | 1/2005 | Wang | H04L 47/10 370/235 |

OTHER PUBLICATIONS

Krishnan, "Flow-aware Real-time SDN Analytics (FRSA)," http://blog.sflow.com/2014/02/flow-aware-real-time-sdn-analytics-frsa.html, pp. 1-13 (Feb. 2014).

* cited by examiner

*Primary Examiner* — Khoa Huynh
(74) *Attorney, Agent, or Firm* — Jenkins, Wilson, Taylor & Hunt, P.A.

(57) ABSTRACT

Methods, systems, and computer readable media for storing data associated with packet related metrics are disclosed. According to one method, the method includes generating a test packet including a port tuple sequence number (PTSN), wherein the PTSN indicates a number of packets across multiple flows associated with a same port tuple, wherein the port tuple indicates an ingress port and an egress port that the test packet traverses at a device under test (DUT), and storing the PTSN in an entry of a data structure, wherein the entry is indexed by the port tuple.

17 Claims, 5 Drawing Sheets

FIG. 1

| PORT TUPLE | FLOW ID (FLID) | PORT TUPLE SEQUENCE NUMBER (PTSN) |
|---|---|---|
| A1 | 23423, 342, 345, 5646, 21, 234 | 45646 |
| A2 | 678, 32, 896 | 13154 |
| A3 | 4535, 57858 | 457 |
| AB | 98778, 2134 | 596 |
| AC | 12, 897 | 123 |
| B1 | 2345, 2346, 2347, 2348 | 768 |
| B2 | 7897 | 239 |
| ••• | ••• | ••• |
| 21 | 999521, 3451, 145689 | 360 |
| 23 | 600, 44 | 3 |
| 3A | 2138 | 9 |
| 3B | 1789, 5675 | 238 |
| 3C | 973, 5685 | 85 |
| 31 | 37231, 37232 | 1835 |
| 32 | 97, 98 | 11 |

STORING DATA ASSOCIATED WITH PACKET RELATED METRICS

TECHNICAL FIELD

The subject matter described herein relates to processing information. More specifically, the subject matter relates to methods, systems, and computer readable media for storing data associated with packet related metrics.

BACKGROUND

When testing various devices, it is important to make sure that testing mimics real world scenarios and conditions. For example, when testing a data center grade network switch, a test operator may want to stress test the network switch using a substantial number (e.g., hundreds of thousands or millions) of flows (e.g., packet groups or sessions). Conventional testing equipment has limits (e.g., hardware and memory related limits) associated with the number of flows that can be emulated. In particular, the number of concurrent emulated flows is generally related to memory resources. For example, conventional testing equipment typically generates packet related metrics by storing and analyzing packet related data that is indexed by flow identifiers. However, storing packet data for millions of flows requires substantial memory resources, which can be very expensive and inefficient.

Accordingly, in light of these difficulties, a need exists for improved methods, systems, and computer readable media for storing data associated with packet related metrics.

SUMMARY

Methods, systems, and computer readable media for storing data associated with packet related metrics are disclosed. According to one method, the method includes generating a test packet including a port tuple sequence number (PTSN), wherein the PTSN indicates a number of packets across multiple flows associated with a same port tuple, wherein the port tuple indicates an ingress port and an egress port that the test packet traverses at a device under test (DUT), and storing the PTSN in an entry of a data structure, wherein the entry is indexed by the port tuple.

According to one system, the system includes at least a memory. The system to configured to generate a test packet including a PTSN, wherein the PTSN indicates a number of packets across multiple flows associated with a same port tuple, wherein the port tuple indicates an ingress port and an egress port that the test packet traverses at a DUT and to store the PTSN in an entry of a data structure, wherein the entry is indexed by the port tuple.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for storing data associated with packet related metrics. When testing one or more computing or networking resources, it may be desirable to test the resources under non-trivial load conditions that mirror or closely approximate real world scenarios. Test systems may generate test messages that are sent to a device under test (DUT) and returned by the DUT. As used herein, a test message or a test packet may include various data units, such as a packet, a frame, a datagram, a user datagram protocol (UDP) packet, a transport control protocol (TCP) packet, or, more generally, a protocol data unit (PDU). Such test systems may include tag information in each test message such that the test systems can identify the test messages. Exemplary tag information may include a flow identifier (FLID), also referred to herein as a packet group identifier (PGID), and a PTSN. Based on preconfigured information and/or route discovery messages, test systems may be aware of which ports (e.g., an ingress port and an egress port) associated with a DUT that each test message will or should traverse on its way back to the test system.

Conventional test systems track packets and generate packet related metric information for a test by using a memory module or related data structure which includes an entry or record for each unique PGID that is being used in the test. Memory requirements for such a test system are therefore directly proportional to the number of PGIDs (e.g., flows) associated with a given test scenario. As such, conventional test systems require significant memory resources and significant hardware resources for handling test scenarios with substantial flows or sessions.

In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to store or maintain a data structure indexed by port tuples or port tuple identifiers (PTIDs). As used herein, port tuples or PTIDs may include any suitable information associated with a path or a route that a test message travels or traverses (e.g., an ingress port and an egress port associated with a DUT that a test message traverses to return to a test system). For example, an exemplary data structure in accordance with one or more aspects of the present disclosure may include an entry or record for each unique port tuple associated with a DUT. In contrast to conventional testing platforms that maintain packet related data indexed by FLIDs, an exemplary data structure that indexes data using port tuples can minimize memory requirements for packet related data by one or more orders of magnitude. For example, if DUT 106 includes less than ten thousand port tuples (e.g., around a hundred ports), MGM storage 108 may store packet related data associated with a million flows in less than ten thousand data entries.

In accordance with some aspects of the subject matter described herein, a computing platform or module may be configured to generate, process, update, analyze, and/or utilize sequence numbers associated with port tuples, also referred to herein as port tuple sequence numbers (PTSNs). In contrast to conventional sequence numbers that are tied to individual flows or sessions which generally indicate order for those individual flows or sessions, PTSNs may be used across multiple flows to identify packets that are associated with a same port tuple. For example, a first test message for traversing a port tuple may include a PTSN of 'X' and a second test message for traversing the same port tuple may include a PTSN of 'X+1', even if these test messages are associated with (e.g., part of) different flows.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
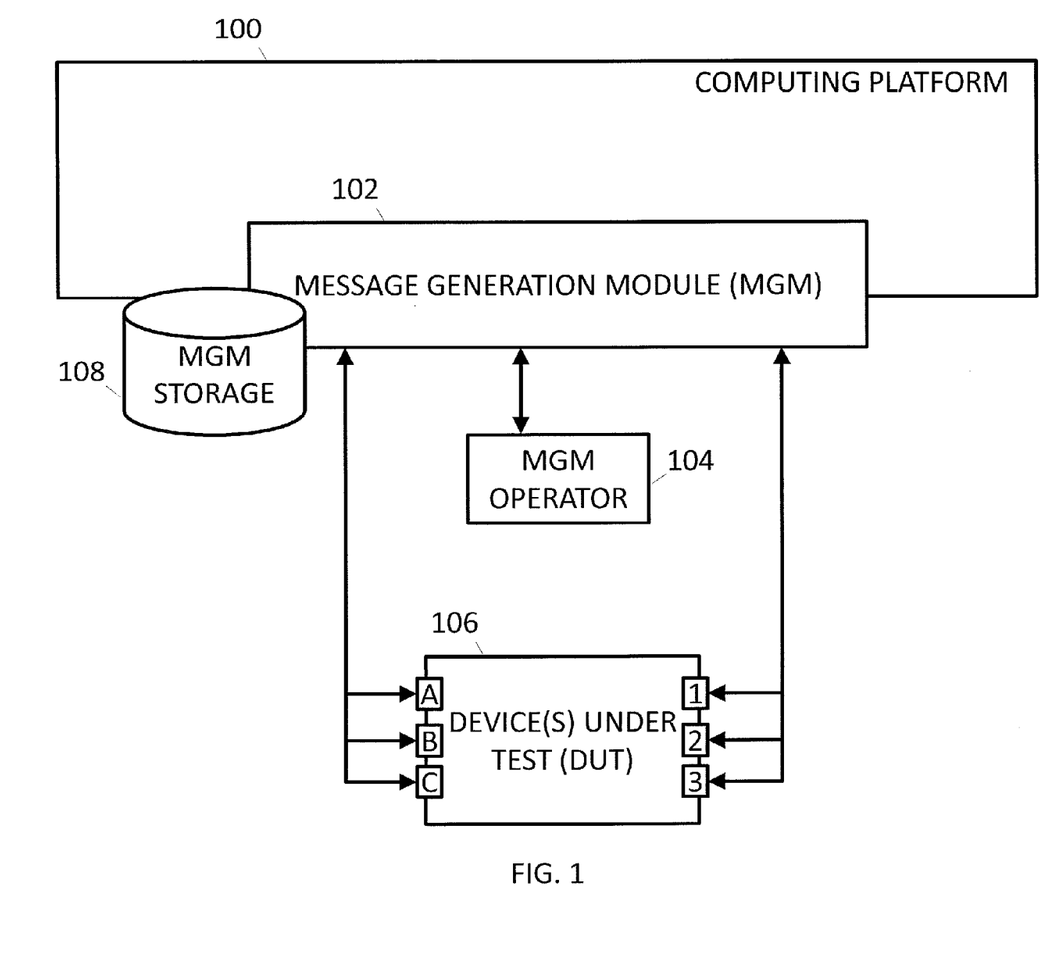
FIG. 1 is a diagram illustrating an exemplary computing platform for storing data associated with packet related metrics according to an embodiment of the subject matter described herein.

FIG. 1 is a diagram illustrating an exemplary computing platform 100 for storing data associated with packet related metrics according to an embodiment of the subject matter described herein. Computing platform 100 may represent any suitable entity or entities (e.g., one or more testing platforms, nodes, or devices) associated with sending or receiving traffic (e.g., one or more data units). For example, computing platform 100 may generate a substantial amount of traffic for testing one or more device(s) under test (DUT) 106. In this example, computing platform 100 may receive traffic from DUT 106 and analyze one or more performance aspects associated with DUT 106.

In some embodiments, computing platform 100 may be a stand-alone tool, a testing device, or software executing on a processor. In some embodiments, computing platform 100 may be a single node or may be distributed across multiple computing platforms or nodes.

In some embodiments, computing platform 100 may include one or more modules for performing various functions. For example, computing platform 100 may include a network node emulation module for emulating a node or device that communicates with DUT 106.

Computing platform 100 may include a message generation module (MGM) 102. MGM 102 may be any suitable entity or entities (e.g., software executing on a processor, an ASIC, an FPGA, or a combination of software, an ASIC, or an FPGA) for performing one or more aspects associated with processing (e.g., receiving, generating, sorting, analyzing, and/or sending) test messages (e.g., packets, frames, and/or other data units). For example, MGM 102 may be configured to generate test messages for a number of emulated flows or sessions. In this example, each test message may include an FLID, a PTSN, and/or other data (e.g., header information and payload information).

In some embodiments, MGM 102 may include functionality for determining and/or associating test messages and port tuples. For example, using via preconfigured information, traffic tests, or route discovery protocols or related messages, computing platform 100 and/or MGM 102 may be aware that test messages of certain flows may be received at or from particular ports associated with DUT 106. Using this port or path awareness, PTSNs may be generated (e.g., computed or incremented) for test messages. For example, MGM 102 may increment a PTSN (e.g., starting at 1) for every test message generated for a port tuple 'A2' after an initial test message in a given test. In this example, a first test message associated with port tuple 'A2' may include a PTSN of '1' and an immediately subsequent test message associated with port tuple 'A2' may include a PTSN of '2'.

In some embodiments, MGM 102 may include one or more communications interfaces (e.g., one or more NICs) for interacting with users and/or nodes. For example, MGM 102 may use one or more communications interfaces for receiving and sending various types of data units; such as IP packets, Ethernet frames, Ethernet packets, PDUs, datagrams, UDP packets, TCP packets, IP version 4 (v4) packets, IP version 6 (v6) packets, stream control transmission protocol (SCTP) packets, real-time transport protocol (RTP) packets, or reliable data protocol (RDP) packets, packets using a tunneling protocol, and/or other data units.

In some embodiments, MGM 102 may provide a communications interface for communicating with MGM operator 104. MGM operator 104 may be any entity (e.g., an automated system or a device or system controlled or controllable by a human user) for selecting and/or configuring various aspects associated with storing packet related data and/or generating packet related metrics. For example, various user interfaces (e.g., an application user interface (API) and a graphical user interface (GUI)) may be provided for providing configuration information, such as a time out period for assuming packet loss, types of metrics to be generated, frequency of metric generation, a number of packets per flow to be generated, a number of packets per port tuple to be generated, and/or a number of flows to emulate in a test scenario. Exemplary user interfaces for testing DUT 106 and/or for providing configuration information may support automation (e.g., via one or more scripting languages), a representation state transfer (REST) API, a command line, and/or a web based GUI.

In some embodiments, MGM 102 may include one or more communications interfaces for interacting with DUT 106. For example, MGM 102 or another entity may be configured to send or receive test messages to or from one or more ports (e.g., ports A, B, C, 1, 2, and/or 3) associated with DUT 106. DUT 106 may be any suitable entity or entities (e.g., devices, systems, or platforms) for communicating with computing platform 100 and/or receiving, processing, forwarding and/or sending one or more test messages. For example, DUT 106 may include a network router, a network switch, a network device, a server, or a network controller. In another example, DUT 106 may include one or more systems and/or computing platforms, e.g., a data center or a group of servers and/or routers. In yet another example, DUT 106 may include one or more networks or related components, e.g., an access network, a core network, or the Internet.

In some embodiments, MGM 102 may include functionality for storing packet related data. For example, prior to sending a test message associated with a port tuple 'B1', MGM 102 may be configured to store information (e.g., an FLID and a PTSN) about the test message in a data structure that indexes such information using port tuples, e.g., at MGM storage 108. In this example, MGM 102 may store this information and/or update existing information in a data structure entry associated with port tuple 'B1'.

In some embodiments, MGM 102 may not store all PTSNs in flight (e.g., PTSN of test packets being sent to DUT 106) in a data structure. For example, packet related information may be stored in ingress (e.g., receive) data structure and/or an egress (e.g., send) data structure. In this example, the egress data structure may store, for each port tuple being tested, a PSTN and/or other information associated with the most recently sent (e.g., to DUT 106) test packet. Continuing with this example, the ingress data structure may store, for each data tuple being tested, a PTSN associated with the last received (e.g., from DUT 106) test packet and/or may store a highest PTSN observed. In another example, MGM 102 may be configured to perform sequence checking using an ingress data structure and information in the packets. In this example, an egress data structure may not be maintained.

In some embodiments, MGM 102 may include functionality for waiting for responses (e.g., test messages and/or other messages) from DUT 106. For example, after sending a test message and storing information about the test message, MGM 102 or another entity may be configured to wait for the test message or related information to be received from DUT 106. In this example, MGM 102 or another entity may use a timer or another technique for determining how long to wait before assuming that the test message was lost or misrouted. If an error message is received and/or after a certain amount of time has elapsed, MGM 102 or another entity may perform one or more actions, such as generating a packet related metric and/or updating a relevant data structure entry.

In some embodiments, MGM 102 may include functionality for analyzing responses received from DUT 106. For example, MGM 102 may be configured to receive a test message from DUT 106 and may determine whether the test message is expected, unexpected, corrupted, and/or out of order. In another example, MGM 102 may be configured to receive an error message from DUT 106 and may determine which, if any, test message, flow, and/or port tuple is associated with the error message.

In some embodiments, analyzing a test message may include identifying, using a port tuple associated with the test message, a data structure entry associated with the test message and/or determining whether information (e.g., an FLID, a PTSN, and/or other data) stored in a relevant data structure entry matches or corresponds to information (e.g., an FLID, a PTSN, and/or other data) in the test message. For example, if information in a test message matches or corresponds to information in a relevant data structure entry, various actions may occur, such as generating one or more packet related metrics associated with a successful packet trip and/or updating the relevant data structure entry. In another example, if information in a test message does not match or correspond to information in a relevant data structure entry, various actions may occur, such as generating one or more packet related metrics associated with an unsuccessful packet trip and/or updating the relevant data structure entry.

In some embodiments, determining whether information (e.g., an FLID, a PTSN, and/or other data) stored in a relevant data structure entry matches or corresponds to information (e.g., an FLID, a PTSN, and/or other data) in the test message may include determining whether the test message is the next expected packet in a sequence for a given port tuple. For example, if an ingress data structure for port tuple 'AC' indicates that the last received PTSN is '123', MGM 102 may determine whether a newly received test packet includes a PTSN of '124'. In this example, if the test packet includes a PTSN of '124', MGM 104 may determine that the test packet is the next expected packet and perform actions accordingly, e.g., update a packet count metric. However, if the test packet does not include a PTSN of '124', MGM 104 may determine that the test packet is not the next expected packet and perform actions accordingly, e.g., log that the test packet has been lost or misrouted.

In some embodiments, MGM 102 may include functionality for generating one or more packet related metrics. Exemplary packet related metrics that can be generated may include a packet loss metric, a packet delay metric, a jitter metric, a packet count metric, a packet ordering metric, a session related metric, a port tuple related metric, or a DUT related metric. For example, after analyzing a received test message associated with a port tuple 'C1', a packet count metric associated with the port tuple may be incremented. In another example, after analyzing an error message and/or determining that a test message associated with a port tuple 'B3' was lost, a packet loss metric associated with the port tuple may be incremented.

In some embodiments, MGM 102 may include functionality for accessing MGM storage 108. MGM storage 108 may be any suitable entity or entities (e.g., a storage device, a non-transitory computer readable medium, or a storage system) for maintaining or storing information related to packets and/or related metrics. For example, MGM storage 108 may contain information usable for generating metrics (e.g., statistics) associated with one or more performance aspects of DUT 106. Exemplary packet related data may include FLID, PTSN, payload information, header information, and/or other related information. In this example, MGM storage 108 may also contain metrics associated with one or more performance aspects of DUT 106 during one or more test scenarios. For example, using configuration information regarding testing, MGM storage 108 may maintain a particular set of computed metrics for a first test and may maintain another set of computed metrics for a second test. In some embodiments, MGM storage 108 may be located at computing platform 100, another node, or distributed across multiple platforms or devices.

It will be appreciated that FIG. 1 is for illustrative purposes and that various nodes and/or modules, locations, and/or functionality described above in relation to FIG. 1 may be changed, altered, added, or removed.

Figure 2:
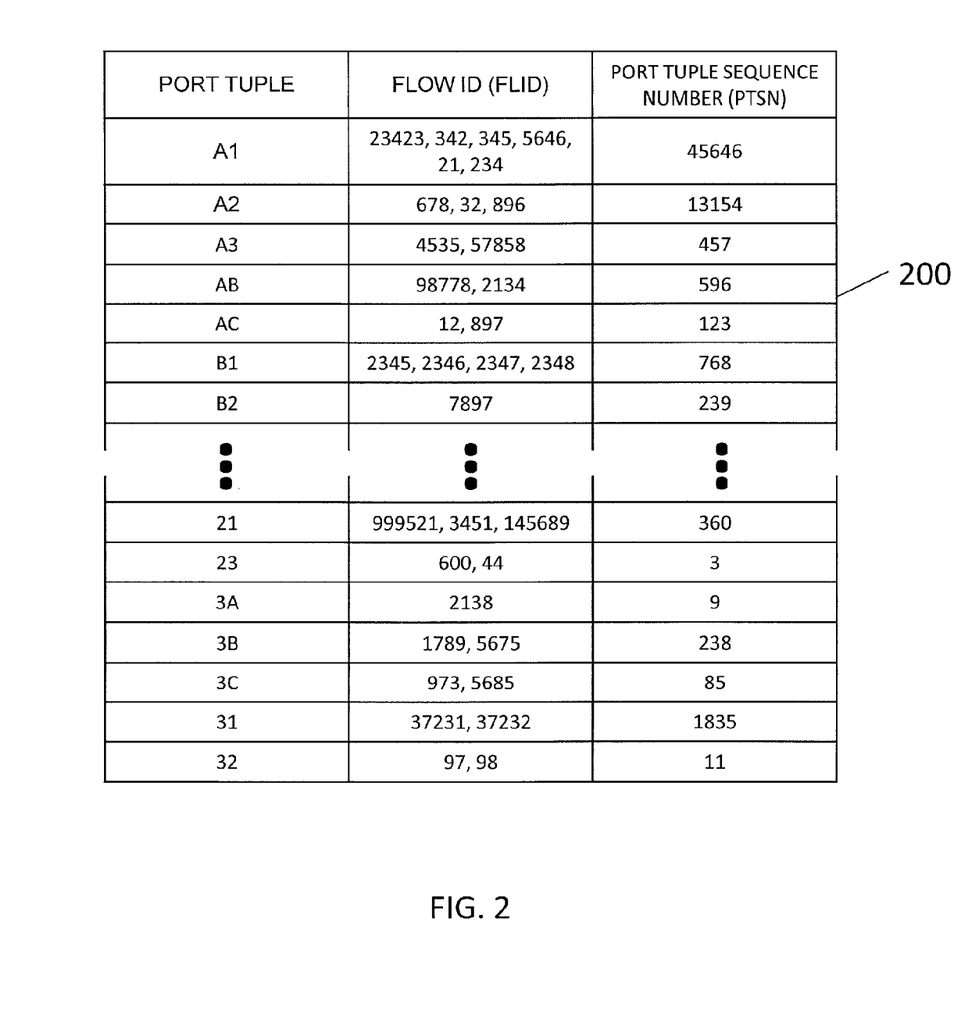
FIG. 2 is a diagram illustrating exemplary data associated with packet related metrics according to an embodiment of the subject matter described herein.

FIG. 2 is a diagram illustrating exemplary packet related data 200 (e.g., data associated with packet related metrics) according to an embodiment of the subject matter described herein. In some embodiments, packet related data 200 may be accessed and/or stored by computing platform 100 and/or MGM 102 using various data structures. In some embodiments, packet related data 200 may include any suitable information, such packet routing information, packet switching information, or other packet related data, for monitoring and/or measuring performance aspects associated with DUT 106.

Referring to FIG. 2, packet related data 200 may be depicted using a table representing associations between port tuples and various information associated with packets, including FLIDs and PTSNs. In some embodiments, packet related data 200 may be stored or maintained in MGM storage 208 and may be usable for generating packet related metrics and/or other functions, such as generating additional test messages or test scenarios.

In some embodiments, port tuples may be used as keys or index values into a data structure for storing packet related data 200. In some embodiments, port tuples may represent an ingress port and an egress port of DUT 106 and/or may be indicative of a path or route taken by test messages before returning to MGM 102 and/or computing platform 100.

In some embodiments, port tuples may be indicated or identified by PTIDs. In some embodiments, a PTID may include any suitable identifier, such as one or more parameter values located in a header portion of a packet, usable for identifying a port tuple. For example, MGM 102 may generate and send a test packet containing a PTID of 'AC' to DUT 106. In some embodiments, a PTID may be stored in or associated with other header information in a test packet. For example, a FLID may include a PTID, such as '1324AC' or '4564BC', or both identifiers may be stored in a same header field.

In some embodiments, port tuples and/or related data structure entries may be predefined prior to, subsequent to, or concurrent with a test period. For example, MGM 102 and/or another entity may use a route discovery protocol or a test operator's knowledge to identify one or more port tuples active for traffic during a testing period. In this example, a related data structure may include data entries for each port tuple, where each entry has default values (e.g., blank, null, or 0) for various information. In another example, a related data structure may generate one or more data entries on as-needed basis, such as when a first test message associated with a port tuple is generated.

In some embodiments, an FLID may include any suitable identifier, such as a session identifier or a group or tuple of packet header information, usable for identifying one or more related packets. For example, an FLID may include a 5-tuple including (1) source address(es), (2) destination address(es), (3) source port number(s), (4) destination port number(s), and (5) application protocol(s) (e.g., transmission control protocol (TCP), user datagram protocol (UDP)). In another example, such as depicted in FIG. 2, an FLID may include a single value, such as a session identifier used by one or more protocols or entities.

In some embodiments, one PTSN may be associated with a record or data structure entry in a packet related data structure. For example, MGM 102 may send one test message associated with a given port tuple to DUT 106 and only send another test message associated with the same port tuple when the first test message or error indication is received and/or after a certain amount of time has elapsed. In this example, a PTSN associated with a data structure entry may indicate a test message sent to DUT 106 but not yet received or acknowledged from DUT 106.

In some embodiments, multiple PTSNs may be associated with a record or data structure entry in a packet related data structure. For example, MGM 102 may send a first test message indicating a PTSN of '60' to DUT 106 and, prior to receiving the first test message or an error indication about the first test message back from DUT 106, MGM 102 may send a second test message indicating a PTSN of '61'. In this example, a relevant data structure entry may include both PTSNs. If the first test message is received before the second test message, a packet count metric may be incremented and/or the PTSN associated with the first test message may be removed from the data structure entry. If the second test message is received before the first test message, a packet loss metric may be incremented (e.g., the first test message may be considered lost) and both PTSNs may be removed from the data structure entry.

It will be appreciated that packet related data 200 in FIG. 2 is for illustrative purposes and that different and/or additional information may also be stored or maintained. For example, packet related data 200 may also include timestamps (e.g., time of transmission to DUT 106) associated with test messages, such timestamps may be used in generating delay metrics and/or may be used to set timers for assuming packet loss.

Further, it will be appreciated that packet related data 200 may be stored in various data structures, memories, media, and/or in one or more locations. For example, MGM 102 may maintain an ingress data structure for storing information about packets being received from DUT 106 and an egress data structure for storing information about packets being sent to DUT 106. In another example, PTIDs and/or PSTNs for packets may be stored in a data structure separate from FLIDs or other information.

Figure 3A:
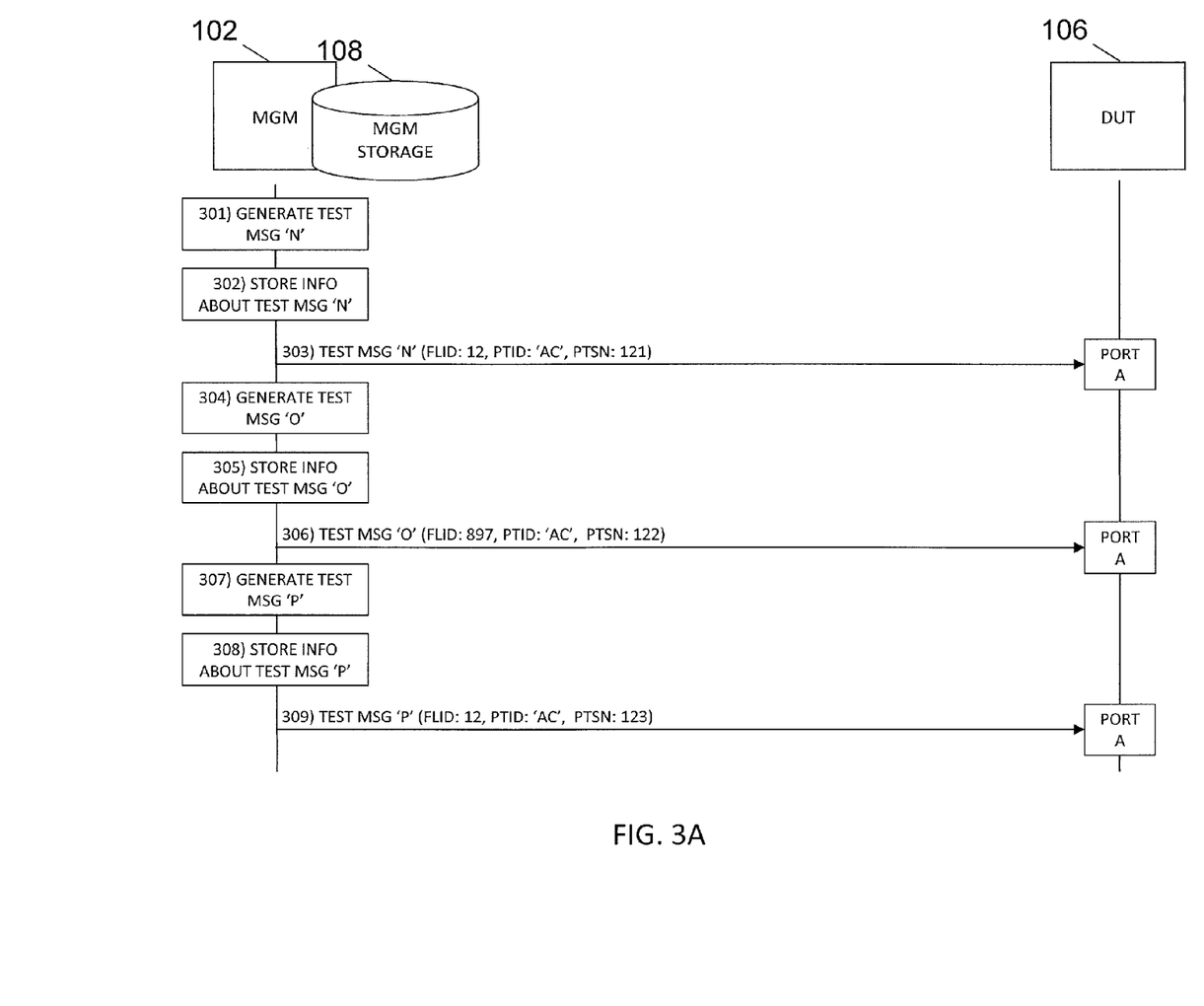
FIGS. 3A and 3B are diagrams illustrating generating packet related metrics according to an embodiment of the subject matter described herein.
Figure 3B:
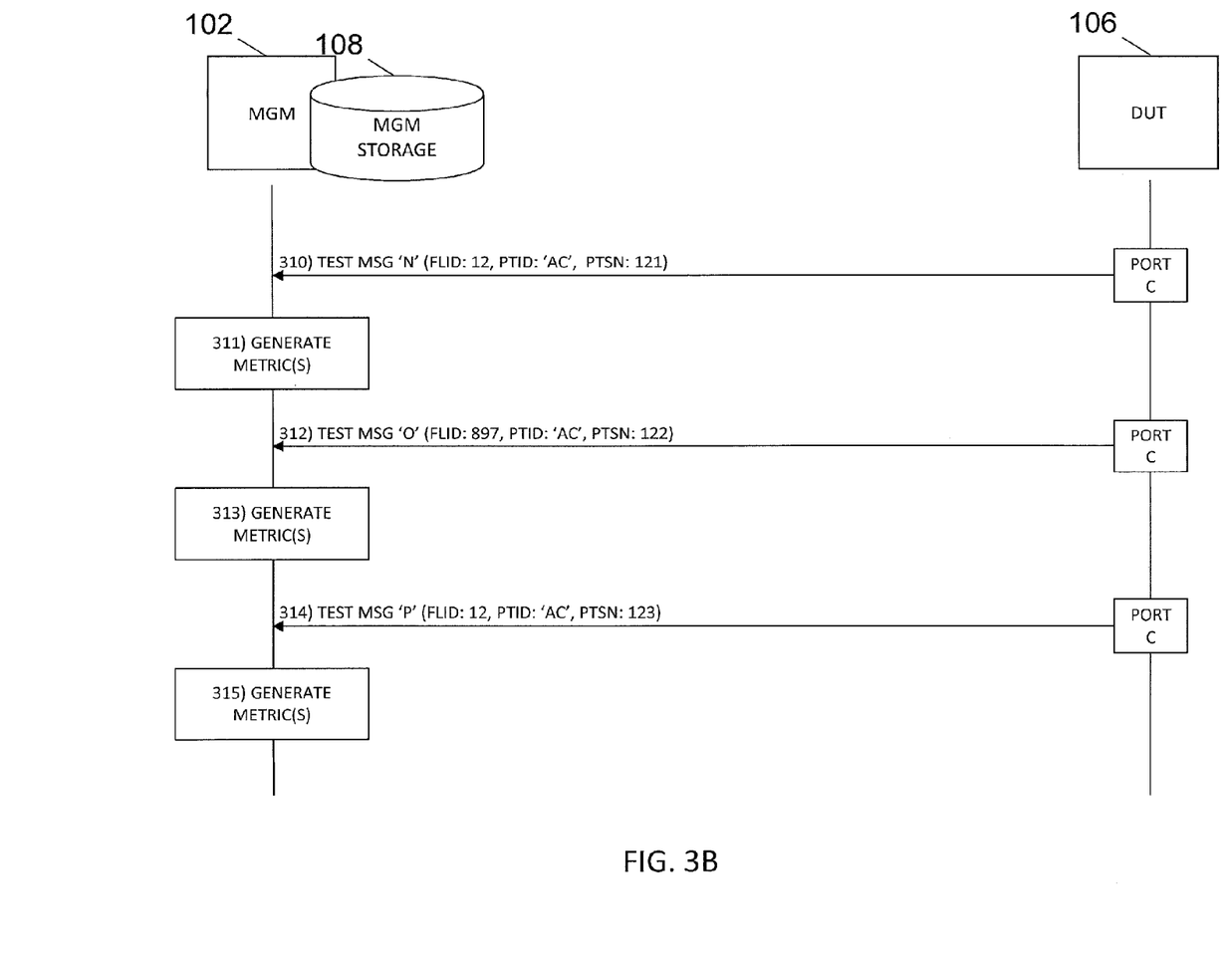

FIGS. 3A and 3B are diagrams illustrating generating packet related metrics according to an embodiment of the subject matter described herein. In some embodiments, MGM 102 may be configured to generate messages for testing one or more performance aspects associated with DUT 106. In some embodiments, MGM 102 and/or MGM storage 108 may maintain packet related data indexed by port tuples associated with DUT 106. In some embodiments, MGM 102 may generate PTSNs based on a related port tuple (e.g., instead of FLID) and may include the PTSNs in corresponding test messages.

Referring to FIG. 3A, at step 301, MGM 102 may generate a test message 'N' associated with a port tuple 'AC'. Test message 'N' may represent a packet including an FLID of '12', a PTID of 'AC', and a PTSN of '121' and may be for traversing DUT 106 using an ingress port 'A' and an egress port 'C'.

At step 302, information about test message 'N' may be stored or maintained, e.g., at MGM storage 108. For example, MGM 102 may create or update an entry in an egress data structure containing packet related data associated with packets being sent to DUT 106. In this example, the entry may be indexed by or identified based on port tuple 'AC'. Continuing with this example, MGM 102 may store the FLID, the PTSN, and/or other information included in test message 'N', e.g., in the egress data structure or other data structures.

At step 303, test message 'N'' may be sent to DUT 106 via port 'A'. For example, MGM 102 or another entity may send test message 'N' after storing various information about the test message in MGM storage 108. In this example, DUT 106 may receive the test message and process (e.g., forward) the message At step 304, MGM 102 may generate a test message 'O' associated with port tuple 'AC'. Test message 'O' may represent a packet including an FLID of '897', a PTID of 'AC', and a PTSN of '122' and may be for traversing DUT 106 using an ingress port 'A' and an egress port 'C'.

At step 305, information about test message 'O' may be stored or maintained, e.g., at MGM storage 108. For example, MGM 102 may create or update an entry in an egress data structure containing packet related data associated with packets being sent to DUT 106. In this example, the entry may be indexed by or identified based on port tuple 'AC'. Continuing with this example, MGM 102 may store the FLID, the PTSN, and/or other information included in test message 'O'.

At step 306, test message 'O' may be sent to DUT 106 via port 'A'. For example, MGM 102 or another entity may send test message 'O' after storing various information about the test message in MGM storage 108. In this example, DUT 106 may receive the test message and process (e.g., forward) the message.

At step 307, MGM 102 may generate a test message 'P' associated with port tuple 'AC'. Test message 'P' may represent a packet including an FLID of '12', a PTID of 'AC', and a PTSN of '123' and may be for traversing DUT 106 using an ingress port 'A' and an egress port 'C'.

At step 308, information about test message 'P' may be stored or maintained, e.g., at MGM storage 108. For example, MGM 102 may create or update an entry in an egress data structure containing packet related data associated with packets being sent to DUT 106. In this example, the entry may be indexed by or identified based on port tuple 'AC'. Continuing with this example, MGM 102 may store the FLID, the PTSN, and/or other information included in test message 'P'.

At step 309, test message 'P' may be sent to DUT 106 via port 'A'. For example, MGM 102 or another entity may send test message 'P' after storing various information about the test message in MGM storage 108. In this example, DUT 106 may receive the test message and process (e.g., forward) the message.

Referring to FIG. 3B, at step 310, test message 'N' may be sent from DUT 106 via port 'C' to MGM 102 or another entity (e.g., computing platform 100).

At step 311, one or more packet related metrics may be generated. For example, MGM 102 may analyze information in test message 'O' using a relevant data structure entry and generate packet related metrics. In this example, if the information in the received test message (e.g., a PTSN) matches or corresponds to expected information in the relevant data structure entry, a packet count metric may be incremented and/or another metric may be generated. Continuing with this example, if the information in the received test message does not match or correspond to expected information in the relevant data structure entry, a packet loss metric may be incremented and/or an error related metric may be generated.

In some embodiments, MGM 102 may store packet related data associated with packets received from DUT 106, e.g., in an ingress data structure. For example, MGM 102 may maintain an ingress data structure that contains a PSTN from a previously received test packet for one or more port tuples being tested. In this example, analyzing a test packet may include determining, using a PTSN stored in a relevant ingress data structure entry and a PTSN in a most recently received test packet, whether the most recently received test packet is the next expected packet in a sequence. At step 312, test message 'O' may be sent from DUT 106 via port 'C' to MGM 102 or another entity (e.g., computing platform 100).

At step 313, one or more packet related metrics may be generated. For example, MGM 102 may analyze information in test message 'O' using a relevant data structure entry and generate packet related metrics.

At step 314, test message 'P' may be sent from DUT 106 via port 'C' to MGM 102 or another entity (e.g., computing platform 100).

At step 315, one or more packet related metrics may be generated. For example, MGM 102 may analyze information in test message 'O' using a relevant data structure entry and generate packet related metrics.

It will be appreciated that FIGS. 3A and 3B are for illustrative purposes and that different and/or additional steps other than those depicted in FIGS. 3A and 3B may occur.

Figure 4:
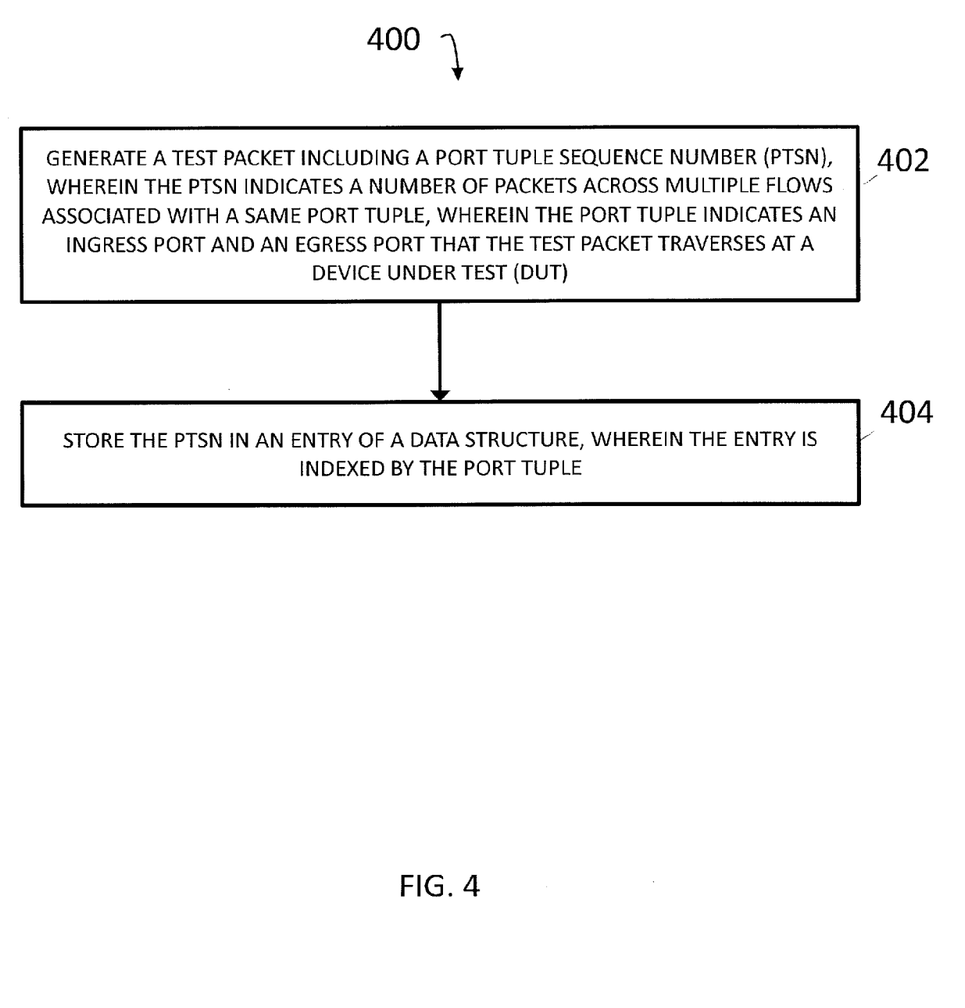
FIG. 4 is a diagram illustrating an exemplary process for storing data associated with packet related metrics according to an embodiment of the subject matter described herein.

FIG. 4 is a diagram illustrating an exemplary process for storing data associated with packet related metrics according to an embodiment of the subject matter described herein. In some embodiments, exemplary process 400, or portions thereof, may be performed by or at computing platform 100, MGM 102, and/or another node or module. For example, computing platform 100 may include a network equipment test device and/or a testing platform for testing one or more performance aspects associated with DUT 106.

At step 402, a test packet may be generated. The test packet may include a PTSN. The PTSN may indicate a number of packets across multiple flows associated with a same port tuple. The port tuple may indicate an ingress port and an egress port that the test packet traverses at DUT 106. For example, MGM 102 may generate a test packet including an FLID value of '12' and a PTSN of 123. In this example, the test packet may be associated with a port tuple 'AC', where the port tuple 'AC' indicates two ports (e.g., ingress port 'A' and egress port 'C') that the test packet will traverse at DUT 106.

In some embodiments, a test message may include a PTID indicating a port tuple and/or an FLID indicating an associated flow. For example, a test message may include a combined identifier of '134BC' indicating a flow '123' and a port tuple 'AC'. In some embodiments, a PTID may be an explicit field or parameter value in a packet or may be information that is directly or indirectly derived from other fields already present in the packet. For example, MGM 102 may determine that an IP address "10.0.0.1" indicates a PTID "1" and an IP address "10.0.1.2" indicates a PTID "2".

In some embodiments, a PTID may indicate a traffic class or priority. For example, some packets may be associated with a PTID of 'AC1' and other packets may be associated with a PTID of 'AC2'. In this example, packets associated with a PTID of 'AC1' may be handled differently than the packets associated with a PTID of 'AC2'. By allowing PTIDs to indicate traffic classes, MGM 102 or a related entity may determine whether packets associated with a certain traffic class are received in sequence, e.g., in scenarios where DUT 106 can reorder packets associated with different traffic classes.

At step 404, the PTSN may be stored in an entry of a data structure, wherein the entry is indexed by the port tuple. For example, MGM 102 or another entity may store a PTSN for a test packet in MGM storage 108. In this example, the PTSN may be stored at a data structure entry that is associated with a corresponding port tuple (e.g., port tuple 'AC'). In another example, MGM 102 may also store additional information related to a test packet, such as an FLID or other flow identifying information. In this example, an FLID or flow identifying information may be stored in a separate data structure or in a data structure that includes PTSNs and/or other information.

In some embodiments, a test packet may be sent to an ingress port of DUT 106, the test packet may be received from an egress port of DUT 106, the test packet may be analyzed using information in the test packet and information stored in a data structure, and one or more packet related metrics may be generated.

In some embodiments, analyzing the test packet may include identifying, using the port tuple associated with the test packet, the entry associated with the test packet and determining, using a PTSN stored in the data structure entry and the PTSN in the test packet, whether the test packet is an expected packet in a sequence. For example, MGM 102 may determine whether the PTSN (e.g., '455') in a test packet is exactly one more than the PSTN (e.g., '454') stored in the data structure entry. In another example, MGM 102 may determine whether a relevant data structure entry contains a previous PTSN in a given sequence. In yet another example, MGM 102 may not know or care about an exact sequence, but may be configured to determine whether a received packet is at least one packet in a group of expected packets, e.g., determining whether packets represented as "1", "2", "3", and "4" are received regardless of order, such as "3", "1", "4", and '2'.

In some embodiments, in response to determining that a test packet is not the next expected packet in a sequence, the test packet may be logged as being misrouted or lost.

In some embodiments, analyzing a test packet may include identifying, using a port tuple associated with the test packet, a data structure entry associated with the test packet and determining whether a PTSN or other information stored in the data structure entry matches or corresponds to a PTSN or other information in the test packet.

In some embodiments, generating one or more packet related metrics may include generating a packet loss metric, a packet count metric, a packet ordering metric, or a packet delay metric. For example, after determining that a received test packet includes information that matches data stored in a relevant data structure entry, a packet count metric may be computed or updated (e.g., incremented by 1). In another example, after determining that a received test packet includes information that does not match data stored in a relevant data structure entry, a packet loss metric may be computed or updated (e.g., incremented by 1).

In some embodiments, at least a portion of the data structure is stored in a static random-access memory (SRAM) a dynamic random-access memory (DRAM), a latch, a register, or a storage element. For example, MGM storage 106 may utilize SRAM, DRAM, a combination of SRAM and DRAM, and/or another non-transitory computer readable medium to implement a data structure for storing data associated with packet related metrics.

In some embodiments, DUT 106 may include a network switch, a network router, or a network device.

In some embodiments, a PTSN may be incremented for every original packet transmitted to the DUT that traverses the port tuple regardless of an FLID associated with the original packet. For example, two test packets associated with port tuple '23' may be consecutively generated by MGM 102. The first test packet may be include an FLID of '600' and a PTSN of '2' and the second test packet may include an FLID of '44' and a PTSN of '3'.

In some embodiments, a port tuple may be determined prior to generating the test packet. For example, computing platform 100 and/or MGM 102 may be aware that test packets of certain flows may be traverse particular ports at DUT 106. Using this port or path awareness to identify port tuples, computing platform 100 and/or MGM 102 may be configured to index, analyze, and/or processing packet related data and/or to generate packet related metrics.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for storing data associated with packet related metrics, the method comprising:
   generating a test packet including a port tuple sequence number (PTSN), wherein the PTSN is generated using port or path awareness information and indicates a position of the test packet within a sequence of packets associated with a same port tuple, wherein the sequence of packets includes packets from different flows, wherein the port tuple indicates an ingress port and an egress port that the test packet traverses at a device under test (DUT);
   storing the PTSN in an entry of a data structure, wherein the entry is indexed by the port tuple;
   sending, to the ingress port of the DUT, the test packet;
   receiving, from the egress port of the DUT, the test packet;
   analyzing, using information in the test packet and information stored in the data structure, the test packet, wherein analyzing the test packet includes identifying, using the port tuple associated with the test packet, the entry associated with the test packet and determining, using a PTSN stored in the data structure entry and the PTSN in the test packet, whether the test packet is an expected packet in the sequence of packets associated with the same port tuple; and
   generating one or more packet related metrics using the analyzing.

2. The method of claim 1 wherein the test packet includes a port tuple identifier (PTID) indicating the port tuple or a flow identifier (FLID) indicating an associated flow.

3. The method of claim 2 wherein the port tuple identifier indicates a traffic class or priority.

4. The method of claim 1 wherein generating the one or more packet related metrics includes generating a packet loss metric, a packet delay metric, a jitter metric, a packet count metric, a packet ordering metric, a session related metric, a port tuple related metric, or a DUT related metric.

5. The method of claim 1 wherein at least a portion of the data structure is stored in a static random-access memory (SRAM), a dynamic random-access memory (DRAM), a latch, a register, or a storage element.

6. The method of claim 1 wherein the DUT includes a network switch, a network router, or a network device.

7. The method of claim 1 wherein the PTSN is incremented for every original packet transmitted to the DUT that traverses the port tuple regardless of an FLID associated with the original packet.

8. The method of claim 1 wherein the port tuple is determined prior to generating the test packet.

9. A system for storing data associated with packet related metrics, the system comprising:
   a memory; and
   a processor;
   wherein the system is implemented using the processor and the memory, wherein the system is configured to:
   generate a test packet including a port tuple sequence number (PTSN), wherein the PTSN is generated using port or path awareness information and indicates a position of the test packet within a sequence of packets associated with a same port tuple, wherein the sequence of packets includes packets from different flows, wherein the port tuple indicates an ingress port and an egress port that the test packet traverses at a device under test (DUT);

store the PTSN in an entry of a data structure, wherein the entry is indexed by the port tuple;

send, to the ingress port of the DUT, the test packet;

receive, from the egress port of the DUT, the test packet;

analyze, using information in the test packet and information stored in the data structure, the test packet, wherein analyzing the test packet includes identifying, using the port tuple associated with the test packet, the entry associated with the test packet and determining, using a PTSN stored in the data structure entry and the PTSN in the test packet, whether the test packet is an expected packet in the sequence of packets associated with the same port tuple; and generate one or more packet related metrics using the analyzing.

10. The system of claim 9 wherein the test packet includes a port tuple identifier (PTID) indicating the port tuple or a flow identifier (FLID) indicating an associated flow.

11. The system of claim 10 wherein the port tuple identifier indicates a traffic class or priority.

12. The system of claim 9 wherein the system is configured to generate a packet loss metric, a packet delay metric, a jitter metric, a packet count metric, a packet ordering metric, a session related metric, a port tuple related metric, or a DUT related metric.

13. The system of claim 9 wherein at least a portion of the data structure is stored in a static random-access memory (SRAM), a dynamic random-access memory (DRAM), a latch, a register, or a storage element.

14. The system of claim 9 wherein the DUT includes a network switch, a network router, or a network device.

15. The system of claim 9 wherein the system is configured to increment the PTSN for every original packet transmitted to the DUT that traverses the port tuple regardless of an FLID associated with the original packet.

16. The system of claim 9 wherein the system is configured to determine the port tuple prior to generating the test packet.

17. A non-transitory computer readable medium comprising computer executable instructions embodied in the non-transitory computer readable medium that when executed by a processor of a computer perform steps comprising:

generating a test packet including a port tuple sequence number (PTSN), wherein the PTSN is generated using port or path awareness information and indicates a position of the test packet within a sequence of packets associated with a same port tuple, wherein the sequence of packets includes packets from different flows, wherein the port tuple indicates an ingress port and an egress port that the test packet traverses at a device under test (DUT);

storing the PTSN in an entry of a data structure, wherein the entry is indexed by the port tuple;

sending, to the ingress port of the DUT, the test packet;

receiving, from the egress port of the DUT, the test packet;

analyzing, using information in the test packet and information stored in the data structure, the test packet, wherein analyzing the test packet includes identifying, using the port tuple associated with the test packet, the entry associated with the test packet and determining, using a PTSN stored in the data structure entry and the PTSN in the test packet, whether the test packet is an expected packet in the sequence of packets associated with the same port tuple; and generating one or more packet related metrics using the analyzing.

* * * * *